US010695637B2

(12) United States Patent
Hennessy et al.

(10) Patent No.: US 10,695,637 B2
(45) Date of Patent: Jun. 30, 2020

(54) SPORTS THROWING MOTION TRAINING DEVICE

(71) Applicant: Bowie Hennessy Sports Performance, LLC, Shavano Park, TX (US)

(72) Inventors: Kevin P. Hennessy, Chicago, IL (US); Samuel M. Pro, La Grange Highlands, IL (US); Thomas E. Burdick, Chicago, IL (US); David E. Rogers, Greenville, SC (US)

(73) Assignee: Bowie Hennessy Sports Performance, LLC, Shavano Park, TX (US)

( * ) Notice: Subject to any disclaimer, the term of this patent is extended or adjusted under 35 U.S.C. 154(b) by 0 days.

(21) Appl. No.: 16/557,506

(22) Filed: Aug. 30, 2019

(65) Prior Publication Data
US 2020/0070028 A1 Mar. 5, 2020

Related U.S. Application Data

(60) Provisional application No. 62/725,159, filed on Aug. 30, 2018.

(51) Int. Cl.
*A63B 69/36* (2006.01)
*A63B 69/00* (2006.01)
(Continued)

(52) U.S. Cl.
CPC ...... *A63B 69/0079* (2013.01); *A63B 71/0622* (2013.01); *G06N 5/04* (2013.01); *A63B 69/0002* (2013.01); *A63B 2069/0006* (2013.01); *A63B 2071/0625* (2013.01); *A63B 2071/0655* (2013.01); *A63B 2071/0694* (2013.01);
(Continued)

(58) Field of Classification Search
USPC .................................. 473/219, 226, 256, 428
See application file for complete search history.

(56) References Cited

U.S. PATENT DOCUMENTS

| 2,396,408 A * | 3/1946 | Benecke ............ A63B 69/3635 473/234 |
| 2,935,321 A | 5/1960 | Lhotka ............................ 273/67 |

(Continued)

FOREIGN PATENT DOCUMENTS

| GB | 2538496 | 11/2016 | ............. A63B 43/00 |
| JP | 2018086288 | 6/2018 | ............. A63B 43/00 |
| WO | WO201827280 | 2/2018 | ............. A63B 37/02 |

OTHER PUBLICATIONS

A look at smart balls, https://sportstechnologyblog.com/2015/03/01/a-look-at-smart-balls/ , pp. 1-6 (Jul. 13, 2018).
(Continued)

*Primary Examiner* — Nini F Legesse
(74) *Attorney, Agent, or Firm* — Benjamin D. Rotman; Rosenbaum IP, P.C.

(57) ABSTRACT

The invention includes a throwing motion training system and device configured to track arm motion and provide predictive ball motion data without the athlete ever having to release the device is provided. The device is configured with a plurality of sensors configured to transmit motion data to data analysis software internal to the device or configured on an external computing system. The data analysis software is configured to prepare and share motion tracking data and predictive ball motion data.

20 Claims, 13 Drawing Sheets

(51) Int. Cl.
*G06N 5/04* (2006.01)
*A63B 71/06* (2006.01)

(52) U.S. Cl.
CPC ....... *A63B 2209/08* (2013.01); *A63B 2220/36* (2013.01); *A63B 2220/40* (2013.01); *A63B 2220/56* (2013.01); *A63B 2220/833* (2013.01); *A63B 2225/50* (2013.01)

(56) References Cited

U.S. PATENT DOCUMENTS

| | | | | |
|---|---|---|---|---|
| 3,743,297 A * | 7/1973 | Dennis | ................... | A63B 15/00 473/242 |
| 5,045,014 A | 9/1991 | Harkins | ........................ | 446/236 |
| 5,590,875 A * | 1/1997 | Young | ................... | A63B 15/005 473/457 |
| 6,024,660 A | 2/2000 | Romanick | ..................... | 473/596 |
| 6,093,118 A | 7/2000 | Simpson | ....................... | 473/424 |
| 6,966,844 B2 * | 11/2005 | Welles | ................... | A63B 15/00 473/219 |
| 7,147,580 B2 * | 12/2006 | Nutter | ................... | A63B 15/005 473/457 |
| 8,246,495 B2 | 8/2012 | James | .......................... | 473/451 |
| 8,540,584 B1 * | 9/2013 | Sorenson | ............... | A63B 69/36 473/256 |
| 9,457,251 B2 | 10/2016 | Thurman | ........... | A63B 69/0002 |
| 9,526,951 B1 | 12/2016 | Ganson | ................ | A63B 43/004 |
| 9,656,142 B2 | 5/2017 | Thurman et al. | .. | A63B 69/0071 |
| 9,662,556 B2 | 5/2017 | San Juan | ............... | A63B 69/00 |
| 9,724,570 B2 | 8/2017 | Krysiak et al. | ......... | A63B 43/06 |
| D808,484 S * | 1/2018 | Oyler | .......................... | D21/791 |
| 2003/0220173 A1 | 11/2003 | Parker | ............................ | 482/44 |
| 2007/0155525 A1 * | 7/2007 | Davenport | ........... | A63B 15/005 473/256 |
| 2014/0135151 A1 | 5/2014 | Johnston | ............ | A63B 69/0002 |
| 2014/0228157 A1 | 8/2014 | Johnston | ............. | A63B 43/002 |
| 2016/0354666 A1 | 12/2016 | Greenwalt et al. | ......................... | A63B 69/0002 |

OTHER PUBLICATIONS

Batdelger, D. et al., Development of a smart cricket ball for advanced performance analysis of bowling, the International Design Technology Conference, DesTech2015, pp. 1-5 (Jul. 22, 2015).

PCT International Search Report and Written Opinion issued in a related foreign application, PCT/US2019/049156, pp. 1-8 (dated Dec. 5, 2019).

\* cited by examiner

SPORTS THROWING MOTION TRAINING DEVICE

CROSS REFERENCE TO RELATED APPLICATIONS

The present application claims priority from U.S. Provisional Patent Application Ser. No. 62/725,159, filed on Aug. 30, 2018, and is hereby incorporated by reference in its entirety.

BACKGROUND OF THE INVENTION

The present invention generally relates to the field of sports throwing motion training devices. More particularly, the invention relates to a throwing motion training device comprising a plurality of data collecting sensors configured to remain in a user's hand.

While learning to pitch or throw a ball safely with proper mechanics, athletes have historically relied feedback provided by human observation and feedback provided through throwing motion training devices. A coach, an outside observer, or the athlete would observe or perceive the throwing motion and provide corrective feedback during or after the throwing session. Coaches would video record athletes or athletes would often video record themselves to observe the throwing motions and attempt to correct the motion for proper mechanics after review of the tape. Athletes and coaches would also practice throwing motions in the mirror to observe real time movements.

To supplement direct observation, athletes and coaches would integrate motion training devices that could provide active feed to the throwing motion while the athlete was practicing. The devices included mechanical solutions that would cause the device to light up, provide tactile feedback, or even audible alerts when the proper motions had been conducted. One such device includes the Sports Ball Throwing Training Device as described by U.S. Pat. No. 6,024,660 ("Romanick"). The Romanick patent describes a device configured to be held and remain in the athlete's hand during throwing motion practice. The device is ball-shaped and includes an elongated hollow tubular member with closed ends and an inner dowel which is freely moveable longitudinally within the hollow tube. Depending on the throwing motion, the dowel would move through the tube and activate the alert by tripping a mechanical switch indicating proper throwing motion. In some variations of the device, the device included an electric circuit internal to the ball and used a mercury switch to act as the dowel.

The advantage to using a Romanick device was that the athlete would get immediate feedback on throwing motion and could practice on their own without another person. A disadvantage of the device is that without a coach to observe for feedback, the athlete could simply find a motion that would trigger the alert and believe they were making proper throwing motions without necessarily knowing if the mechanics were proper for long term health of the arm and optimal throwing abilities. Another disadvantage to the pure mechanical solution as described above is that the device itself does not give flexibility as to changing types of pitches or throws. For example, in baseball the curveball motion and grip may differentiate from the fastball motion and grip. Mechanical devices as described in the prior art were only preconfigured for one type of motion to trigger the alert and multiple devices were needed to teach multiple throws.

Newer devices that came along included electronic solutions that integrated various sensors into balls. Some of these devices include balls having multiple accelerometers with the ability to track ball velocity, ball path, and ball spin among other metrics and statistics. Some of these devices stored the data on the device to be retrieved at a later time, while other devices included wireless radios that could transmit the data to a computer or mobile phone to track the data and provide real-time analytics. A shortcoming of these newer devices is that they require the ball to actually be thrown to acquire motion data. This requires space to throw the ball and another person or wall/net to stop the ball. The constant impact the device would take over time, the better chance there would be that the sensor device inside would be damaged over time.

Another shortcoming of these devices is that the focus of the data metrics is on ball movement as opposed to arm movement and proper mechanics. The devices still did not provide a solution for proper arm movement during a throwing motion.

The present invention attempts to overcome the shortcomings of the devices above by providing a throwing motion training device having a plurality of sensors configured to track arm motion, provide real-time feedback on mechanics, while predicting throw placement and speed.

SUMMARY OF THE INVENTION

In view of the above, a throwing motion training system and device configured to track ball motion, predict arm motion and provide predictive ball motion data without the athlete ever having to release the device is provided. The advantage of the present invention is that it allows for repeated use in training without subjecting the device or electronics inside to the usual wear, tear, and shock from repeated impacts. An additional advantage of the present invention is that the plurality of sensors and coupled system allow provide instant or near instant feedback and predictive data that was not previously available. Additional applications of the present include injury recovery and physical therapy, as well as injury prevention because optimal form prevents injury from repetitive throwing. Additionally, the invention can be used as a diagnostics tool, especially using comparative analysis. For example when an athlete is "off their game" and not using the invention optimally, previous saved data from when they were using the device optimally can be compared to isolate areas of the exercise that need to be corrected. The device can be used in in any space and does not require a field, a mound, open space, or another person to catch, retrieve, and provide feedback.

In a first embodiment of the invention, the system comprises a device having a ball-shaped housing and a sensor hub disposed within the ball-shaped housing and an external computing device configured to retrieve processed or raw data from the sensor hub and process the data further into throwing motion tracking maps and predictive ball motion data accessible through a graphical user interface. In some embodiments, the ball-shaped housing may be sealed and water-resistant. It is to be understood by one of skill in the art that the term "ball-shaped" may refer to a housing shaped to emulate any ball including but not limited to the shape of a baseball or football or any shape that may emulate the grip of a hand on a ball.

In one aspect of the invention, a hollow tubular member, having a proximal end and distal end, is coupled, at the proximal, end to the ball-shaped housing and projects normal from the ball-shaped housing. As in the Romanick device, the elongated tubular member may comprise a closed or capped distal end and further comprise a motion device such as a dowel disposed within the tubular member configured to move freely along the longitudinal axis of the tubular member. In some embodiments including a dowel, a magnet may be coupled to the proximal end of the elongated tubular member to ensure the dowel is fully seated before the throwing motion begins. In additional embodiments including a dowel and a proximal magnet, a magnetometer may be included in the sensor hub for determining when the dowel begins to pull away from the magnet.

In embodiments having the elongated tubular member as described above, in use, the athlete grabs the proximal end of the tubular member and the ball-shaped housing and proceeds to rotate his or her arm in a circular motion, thereby replicating a throwing motion. During the rotation of the arm, the motion device remains substantially stationary at one end of the tubular member, thereby indicating the proper throwing technique. When a predetermined point is reached during the throwing motion, the athlete will snap his or her wrist to replicate the optimum release point. When the wrist is snapped, the centrifugal force acts upon the motion device, thus forcing the motion device to travel longitudinally within the tubular member eventually impacting the distal end of the tubular member. The resulting impact, may cause a detectable vibration or audible indication of the changed wrist location. During an incorrect throwing technique, the motion device will not move at all or will impact the distal end of the tubular member at an earlier point in the throwing motion, vibrating the device and giving the athlete an audible signal to make the athlete aware of an inaccurate throw.

In the embodiment described above, the sensor hub may comprise a plurality of sensors, a power source, memory having an operating system, a processor, and a data/power port coupled to a printed circuit board (PCB) or flexible circuit element (Flex). In some embodiments, the sensor hub may include a sensor hub housing configured to protect and house the elements of the sensor hub. In other embodiments, the sensor hub may additionally comprise a means for wireless communication including but not limited to Bluetooth, WiFi, Cellular radio, or NFC. It is to be understood by one of skill in the art that the sensor hub may comprise a single PCB or Flex, or may be comprised of a plurality of PCBs and/or Flexes electrically or communicatively coupled.

In one embodiment upon powering on the device, the operating system may run a calibration sub-routine configured to calibrate the plurality of sensors such that the system can properly gage relative positioning of the device with respect to the athlete. Upon movement of the device or upon a specific gesture, the operating system initiates a data-collection subroutine configured to collect data from the sensor and store the data in the memory. Upon stopping of the movement or a stopping gesture, the operating system may be further configured to store time-stamp and date-stamp the data entry. In some embodiments the sensor hub is configured to always collect motion data and buffer the data in the memory for a preset time before and after movement spikes. In these embodiments, the system will process a throwing motion as the recorded data between motions spikes or specific preconfigured gestures.

In some embodiments, upon creating a data entry, the data is transferred to an external computing device configured for data analysis. The data may be transferred through the data port or through the wireless means to a computer, gaming console, mobile device, or cloud server configured to retrieve processed or raw data from the sensor hub and process the data further into throwing motion tracking maps and predictive ball motion data available for display and storage on the external computing device through a graphical user interface.

In an additional embodiment, the sensor hub remains powered in a low powered sleep state calibrated to wake upon consequential movement or detection of a preconfigured gesture. Upon waking, the processor may signal to the wireless communication device to listen for a radio connection or initiate a connection with an external computing device. Once a connection has been established, the sensor hub may begin collecting movement data and store or the data onto the device memory and or transfer the data to the wireless external computing device. The sensor hub may stop collecting data upon a stopping event such as a gesture or detection of full longitudinal movement of the dowel of the device.

In other embodiments of the system data analysis software may be executed on the device and the device may be configured to provide athletes direct feedback via visual, audible, or tactile feedback are possible. In one of these embodiments for example, an LED indicator or display on the device may provide analyzed data back to the user after a throw. In another embodiment, the device may comprise a vibrating motor for tactile signaling or a speaker to provide audio alerts. In these embodiments data processing would be done on sensor hub as opposed to the external computing device.

It is to be recognized by one of skill in the art that the terms "software," "app," "module," "routine," or "sub-routine" may be used interchangeably in this specification to describe a software or component parts thereof. In some embodiments of the present invention, each described module or routine/sub-routine is a component part of a larger set of software instructions while in other embodiments each described module or routine/sub-routine act as independent software applications. It is also to be recognized by one of skill in the art that the term "database" as used may describe a single specific database, or a sub-section of a larger database.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

Other aspects and advantages of the present invention will become apparent upon consideration of the following detailed description, wherein similar structures have similar reference numerals.

DETAILED DESCRIPTION OF THE PREFERRED EMBODIMENTS

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1:
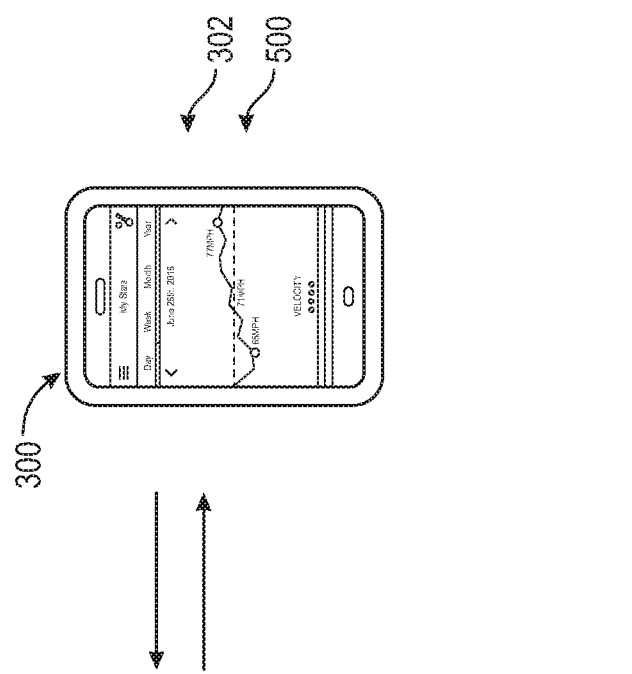
FIG. 1 is a perspective view of the throwing device.
Figure 1:
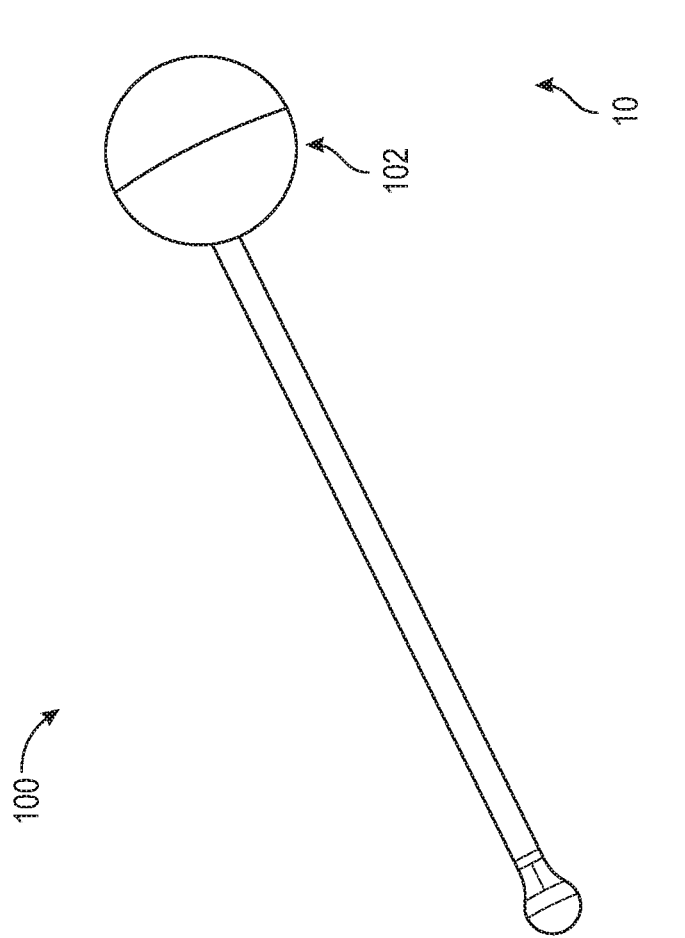
Figure 2A:
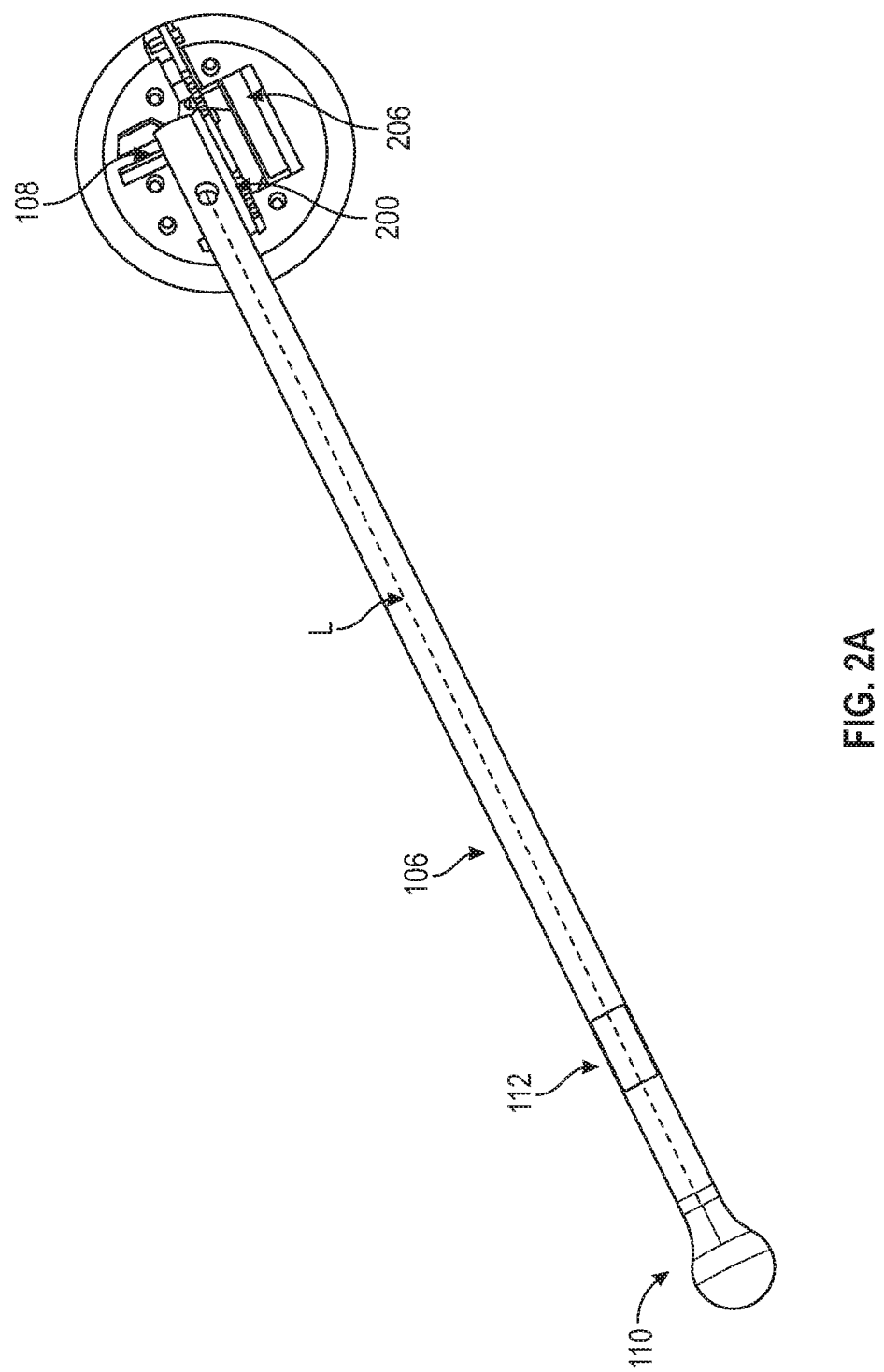
FIGS. 2A-2B show cross-sectional views of the throwing device in various embodiments.
Figure 2B:
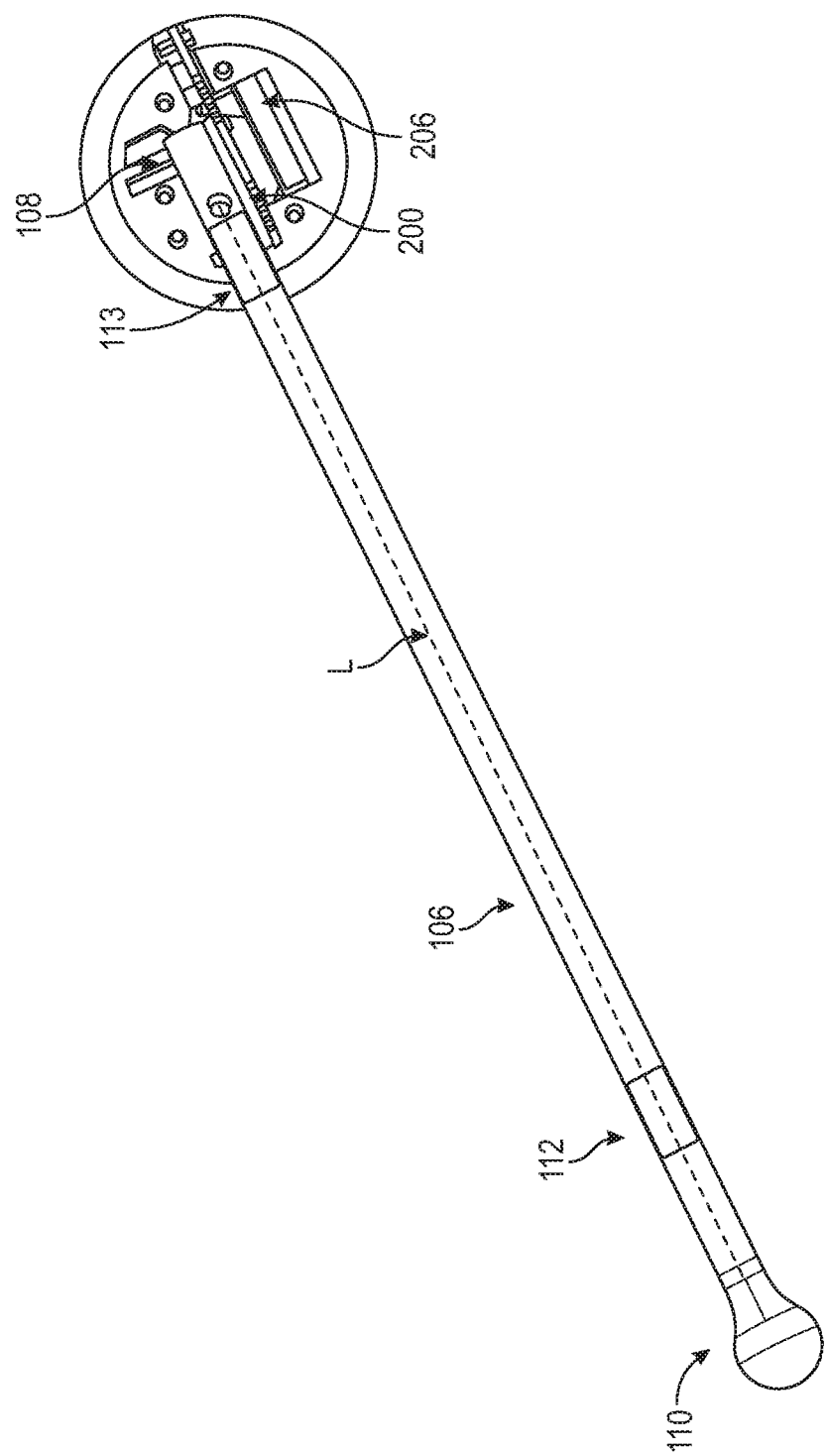

As shown in FIGS. 1 and 2A-2B, the system 10 comprises a device 100 having a ball-shaped housing 102 and sensor hub 200 having a sensor hub operating system 400, disposed within a cavity 104 ball-shaped housing 102 and an external computing device 300 having data analysis software 302 configured to interact with the sensor hub operating system 400 to retrieve processed or raw data from the sensor hub 200 and process the data further into analytical reports including but not limited to throwing motion tracking maps and predictive ball motion data and display the output through a graphical user interface 500 on the external computing device 300. The ball-shaped housing 102 may be a waterproof or water resistant enclosure further comprising an over molded portion and compressible seal or adhesive.

In one embodiment of the invention, the device 100 further comprises a hollow tubular member 106, having a proximal end 108 and distal end 110, is coupled at the proximal end 106 to the ball-shaped housing 102 and projects normal from the ball-shaped housing 102. The tubular member 106 may comprise a closed or capped distal end 110 and further comprise a motion device 112 such as a dowel disposed within the tubular member 106 configured to move freely along the longitudinal axis L of the tubular member 106.

In some embodiments including a dowel 112, as shown in FIG. 2B, a proximal magnet 113 may be coupled to the proximal end 108 of the elongated tubular member 106 to ensure the dowel 112 is fully seated before the throwing motion begins. This magnet 113 establishes a predetermined threshold of force needed for the dowel 112 to start moving. In additional embodiments including a dowel 112 and a proximal magnet 113, a magnetometer (not shown) may be included in the sensor hub 200 for determining when the dowel 112 begins to pull away from the magnet. The magnetometer may also provide the sensor hub operating system 400 and external computing device 300 the orientation in the earth's magnetic field which is then used to improve accuracy when calculating the kinematics of the throw.

Figure 3:
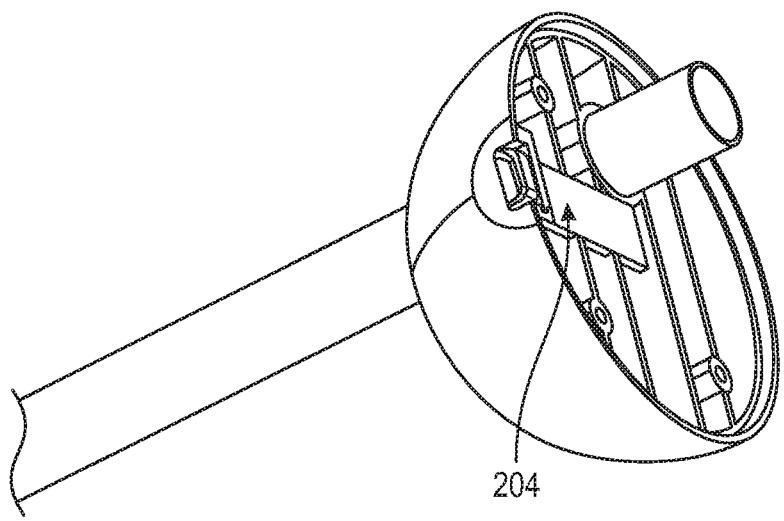
FIG. 3 is a cross-sectional view of an additional embodiment of the throwing device.
Figure 4:
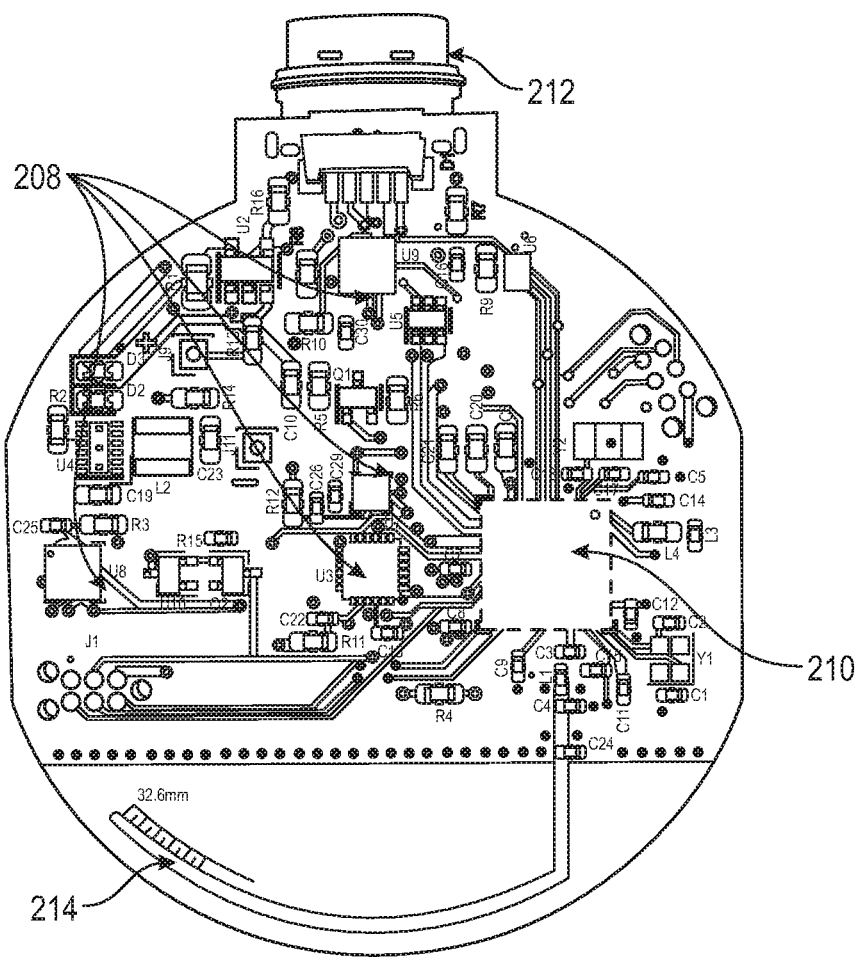
FIG. 4 is a perspective view of an embodiment of the sensor hub.

In the embodiment described above and shown in FIGS. 2-4, the sensor hub 200 may comprise a plurality of sensors 208, a power source 206 and power management circuitry, memory having an operating system, a processor 210, and a data/power port 212 coupled to a printed circuit board (PCB) 202 or flexible circuit element (Flex) (Not Shown). In some embodiments, as shown in FIG. 3 the sensor hub 200 may include a sensor hub housing 204 configured to protect and house the elements of the sensor hub 200. In other embodiments, the sensor hub may additionally comprise a means for wireless communication/external communication including but not limited to Bluetooth, Wi-Fi, Cellular, or NFC radios and antennas 214. In the embodiment shown in FIG. 4 the processor, memory, and Bluetooth means for wireless communication/external communication unit are all packaged in a single unit 210.

In some embodiments, the plurality of sensors 208 may comprise a 6-axis inertial measurement unit sensor (IMU sensor), including a 3-axis accelerometer and 3-axis gyroscope. Alternative embodiments may include additional accelerometers, IMUs, gyroscopes or different combinations of sensors (e.g. magnetic, radar, RF, optical/camera) both integrated inside of the throw training device as well as located externally in other devices. The addition of multiple accelerometers, for example, may be useful for tracking accurate kinematics for 3D viewing and analysis. Some embodiments may include pressure transducers to measure/ infer the grip pressure on the device imparted by the user during the throw.

In one aspect of operation, upon power on the sensor hub operating system 400 may run a calibration sub-routine configured to calibrate the plurality of sensors 208 such that the operating system 400 can properly gage relative positioning of the device 100 with respect to the athlete. Upon movement of the device 100 or upon a specific pre-programed gesture, the operating system 400 initiates a data-collection subroutine configured to collect data from a sensor or all sensors of the plurality of sensors 208 and store the data in the memory. Upon stopping of the movement or a pre-programed stopping gesture, the operating system 400 may be further configured to store time-stamp and date-stamp the data entry. In some embodiments the sensor hub 200 is configured to always collect motion data and buffer the data in the memory for a preset time before and after movement spikes. In these embodiments, the system 400 will process a throwing motion as the recorded data between motions spikes or specific preconfigured gestures.

In some embodiments, upon creating a data entry, the data is transferred to the external computing device 300 configured for data analysis with data analysis software 302. The data may be transferred through the data port or through the wireless or external communication means to a computer, mobile device, or cloud server configured to retrieve processed or raw data from the sensor hub 200 and process the data further into throwing motion tracking maps and predictive ball motion data and display the data through a graphical user interface 500.

Figure 5:
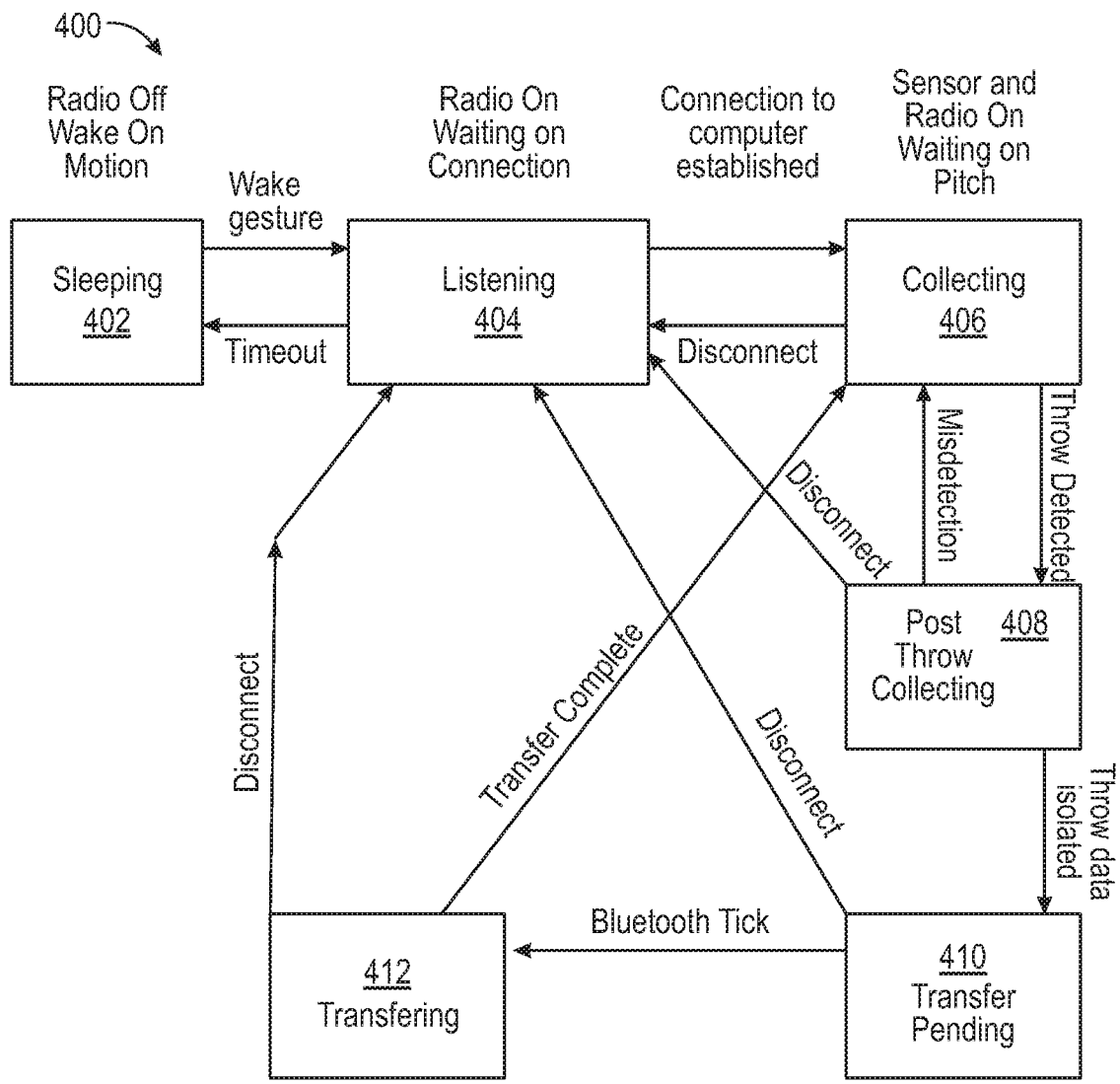
FIG. 5 is a flow chart representing an embodiment of system operation.

In an additional embodiment, as shown in the operational flow chart of FIG. 5, the sensor hub operating system 400 keeps the sensor hub 200 powered in a low powered sleep state 402 calibrated to wake upon consequential movement or detection of a preconfigured gesture. In sleep state, the radio or wireless communication means is turned off, the processor runs at a reduced clock rate, the sensor array or plurality of sensors 208 is placed in a low power mode, and any LEDs or any non-essential components and sub-components remain powered down. When the device 100 is not in use, the device remains in sleep state. Sleep state 402 is intended to only use enough power to sense a wake gesture. The wake gesture is a specific physical movement of the device (e.g. tapping the device 3 times).

Upon waking, the processor 210 may signal to the wireless communication device to listen for a radio connection or initiate a connection with the external computing device 300. In Listening State 404, the radio is turned on and the device is waiting for an external connection or a wireless/ Bluetooth connection from the external computing device 300.

Once a connection has been established, the sensor hub 200 may move to a data collecting state 406 to begin collecting movement data and store or the data onto the device memory and or transfer the data to the wireless external computing device 300. If no connection is established or the device 100 remains inactive, the device 100 may return to a sleeping state 402. In the data collecting state 406, the device 100 is continually monitoring the sensor array A and saving the data into the memory or a ring buffer. The sensor hub operating system 400 also monitors the sensor signals for an indication that a throw has happened or is happening. i.e. a certain threshold and combination of g-forces and rotation imparted on the device and indicates a throw has happened. This "Throw Detected" event is saved and time-stamped in a way that it can be easily referenced against the sensor data that caused it, and triggers a state change to "Post Throw Collecting" 408.

In Post Throw Collecting 408, the "Throw Detected" event is used as a reference point for isolating and extracting the relevant data from the ring buffer that corresponds to the throw in its entirety. The beginning and end points of the data to be isolated are determined based on the sensor data. e.g. the beginning of the data may be the first moment when the ball is relatively fixed and not moving just prior to the Throw Detected event. The endpoint of the data may be when the device has passed through the point of peek acceleration, and total acceleration is decreasing after the Throw Detected event. In this way, the isolated data will contain sensor data from the throw, as well as additional data from immediately before and after the throw.

After the Post Throw Collecting 408 stage is complete, the device initiates a Transfer Pending 410 and Transferring State 412. In the Transfer Pending State 410, the device is no longer collecting data into the ring buffer and prepares to send the throw data to the computer and awaits the appropriate conditions for sending. In the Transferring State 412, the isolated throw data is transferred to the computer 300 for processing. Once the transfer is completed the state changes back to Collecting 406 or back to the Listening State 404.

In some embodiments of the device 100 there may be an additional state situated between Listening 404 and Collecting states 406 that serves as an additional power saving means. In this state, the sensor hub operating system 400 detects the beginning of the throw or a gesture from the user indicating they are about to throw the device that could also serve as a starting point for the throw and corresponding data collection.

When in use, the external computing device 300, such as a mobile phone with app 302 and graphical user interface 500 is activated and the mobile external computing device 300 looks for the device 100 through the aforementioned wireless communication means. The athlete grabs the device 100 near the proximal end 108 of the tubular member 106 and the ball-shaped housing 102 and wakes the sensor hub 200. Waking the sensor hub 200 can be done in a number of ways including but not limited to a power button, a pre-specified gesture, a detected increase in vibration, or detection of a voice or audio signal. Upon waking the sensor hub 200, the sensor hub operating system 400 is configured to look for and pair to the external computing device 300. One of skill in the art would recognize that the steps may be taken in reverse and that the device may be woken up first and the app started second. Before proceeding, the athlete confirms that the motion device 112 is disposed at the proximal end 108 of the tubular member 106. The athlete then proceeds to rotate his or her arm in a circular motion, thereby replicating a throwing motion. The motion is tracked by the sensor hub 200 through any of the processes described above and motion data is acquired. During the rotation of the arm, the motion device 112 remains substantially stationary at one end of the tubular member, thereby indicating the proper throwing technique. When a predetermined point is reached during the throwing motion, the athlete will snap his or her wrist to replicate the optimum release point. When the wrist is snapped, the centrifugal force acts upon the motion device 112, thus forcing the motion device 112 to travel longitudinally within the tubular member 106 eventually impacting the distal end 110 of the tubular member 106. The resulting impact may cause a detectable vibration or audible indication or alert of the changed wrist location. During an incorrect throwing technique, the motion device 112 will not move at all or will impact the distal end of the tubular member at an earlier point in the throwing motion, vibrating the device and giving the athlete an audible signal to make the athlete aware of an inaccurate throw. The vibration or audible signals are detected by the sensor hub data via a spike in erratic movement or a spike in auditory signal volume, thereby signaling to the sensor hub 200 a stopping event. Upon detection of the stopping event, the sensor hub 200 transfers the collected data to the external computing device 300 for data analysis.

Some embodiments may include pressure transducers (not shown) at or below the outer surface of the ball-shaped housing 102 coupled to the sensor hub 200. The pressure transducers may be used to measure/infer the grip placement and pressure on the device imparted by the user during the throw. The sensors may be an array or matrix of capacitive sensors located around the ball, beneath the softer outer layer of the ball-shaped housing 102 and attached to the ridged inner layer of the device. As such the presence or non-presence of the various parts of the hand can be determined from the change in capacitance of the various sensors. Pressure or relative pressure can also be inferred through the same capacitive sensors as the data reading changes based on the proximity of the parts of the hand to the sensor (from compressing the outer layer of the ball) and the flattening of the flesh on the hand as it is compressed around the ball-shaped housing 102. In operation, upon sensing pressure or grip, the sensor hub 200 processes the data or communicates the raw data to the external computing device 300 to determine proper hand location and grip strength. The external computing device 300, through its data analysis software 302 and graphical user interface 500, shows the athlete where the ball-shaped housing 102 was gripped, the grip strength, and compares that data with a pre-populated database that may contain pitch type or throw type to recommend corrections to the athlete.

Figure 6B:
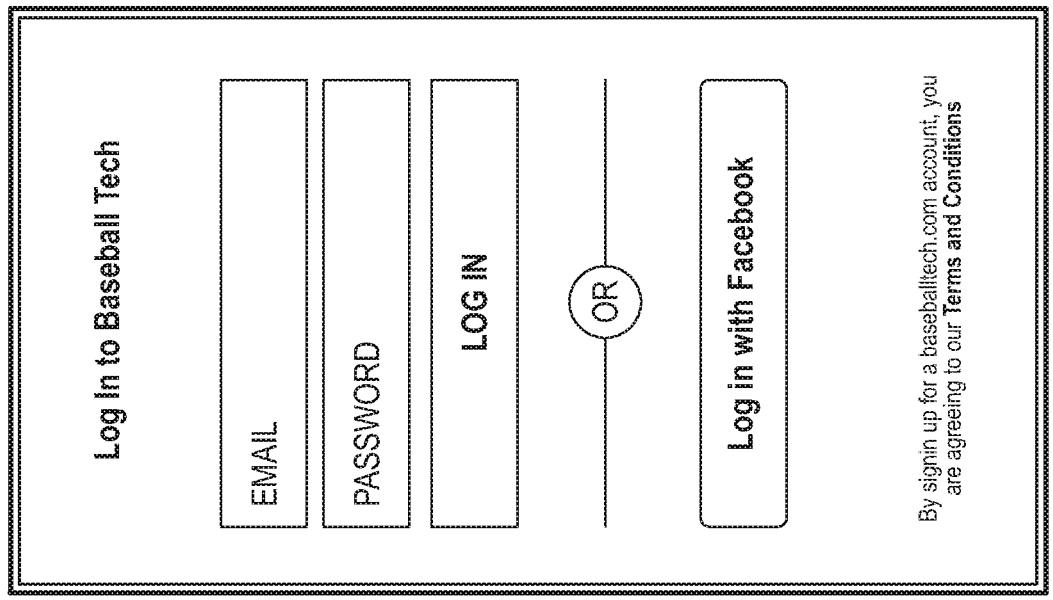
FIGS. 6A-6Q show example embodiments of the data analysis software GUI.

In some embodiments, after reception of the throw data, the data analysis software 302 will process processes the data using an algorithm(s) such as that reported by Sebastian Madgwick in 2010 ("Madgwick algorithm") to calculate orientation, path, and various kinematics of the throw training device during the exercise. FIG. 6Q represents a visualization of the Madgwick algorithm being used on acceleration data (top left) and rotation speed data from the invention (bottom right), to calculate orientation, position, and velocity. Raw data, processed data, and information derived from either can be displayed to the athlete via the data analysis software and additionally fed into a secondary algorithm that can provide feedback to the user with regard to their use of the throw training device. This feedback may include but is not limited to: if the exercise was executed safely (and if not, how to correct it); if the exercise was executed with correct form, strength, timing, etc. (and if not, how to correct it); if the exercise was executed optimally (and if not, how to correct it). Feedback may also include a comparison of the athlete's performance with their past performance, or the performance of others. Athletes are able to tag an exercise or part of an exercise adding metadata to the exercise which may constitute data and may be used in further analysis of the exercise and/or subsequent search/retrieval of the corresponding data.

In additional aspects of the data analysis software 302 and graphical user interface, after a throw is detected and the throw data is processed either in the sensor hub 200 or through the data analysis software 302, the data analysis software 302 produces a "Power" and "Smoothness" rating/score, stores the scores in a database and displays the scores through the graphical user interface 500. The power score is derived accelerometer(s) readings and is a measured approximation of the total energy imparted on the ball before the "release point" of the movement. Smoothness is measured using spectral arc length (SPARC) of both gyro and acceleration data. An aggregate score may be produced, stored and displayed that functions as a general overall measure of the users throwing motion. The scoring data may then be used to estimate potential velocity, i.e. how fast in mph is an athlete is likely to be able to throw a real baseball given their power and smoothness scores (or combination with other collected kinematic data).

In another embodiment of the invention, the data analysis software 302 may be configured to receive data streams from multiple devices simultaneously or one at a time and store the data into separate user profiles. In these embodiments, coaches may be able to administer training to multiple athletes concurrently and store and share separate data sets. Coaches may be able to use these separate data sets to compare athletes' performances.

In an example embodiment, a method of use of the system 10 includes the steps of configuring an external computing device with data analysis software 302, wirelessly coupling the device to the external computing device 300, executing a new training session routine through a graphical user interface (GUI) of the data analysis software, the training session routine executing an instructional sub-routine configured to instruct an athlete through the training session, executing a throwing motion with the device 100, the device processor B collecting data from the plurality of sensors A, storing the data in the device memory, transferring the data wirelessly to data analysis software 302 of the external computing device 300 after each throwing motion, the data analysis software processing the sensor data and preparing a data analysis report, storing the data analysis report and displaying the report through the graphical user interface 500 of the data analysis software 302 to the athlete.

Figure 6A:
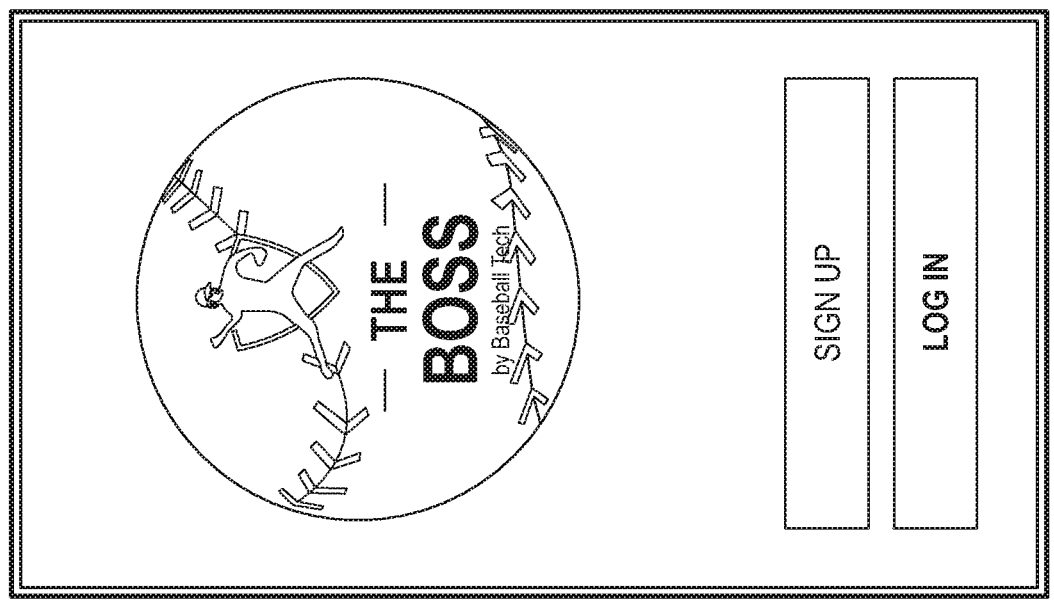
Figure 6D:
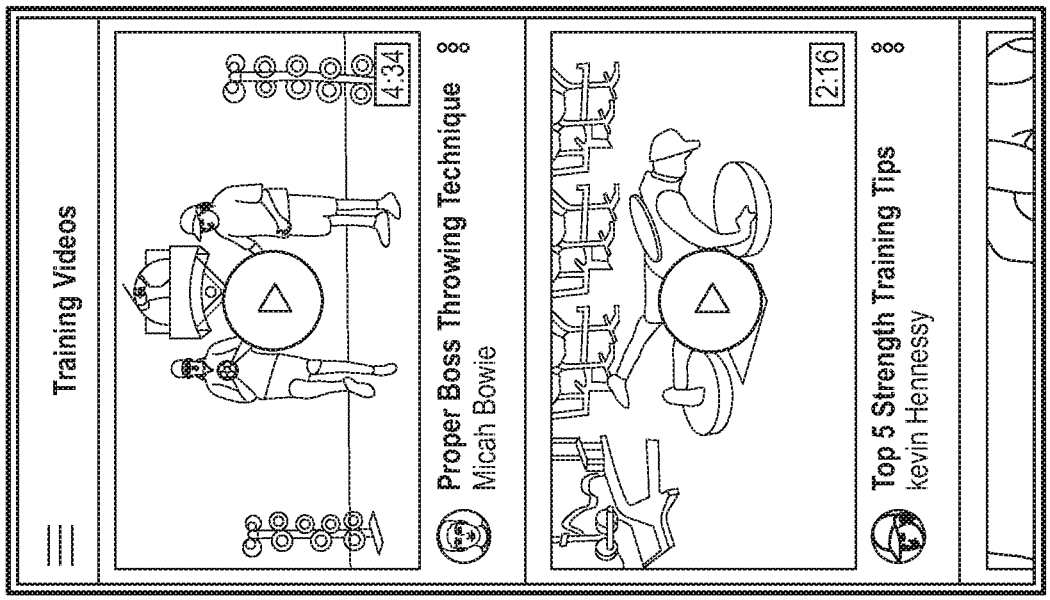
Figure 6C:
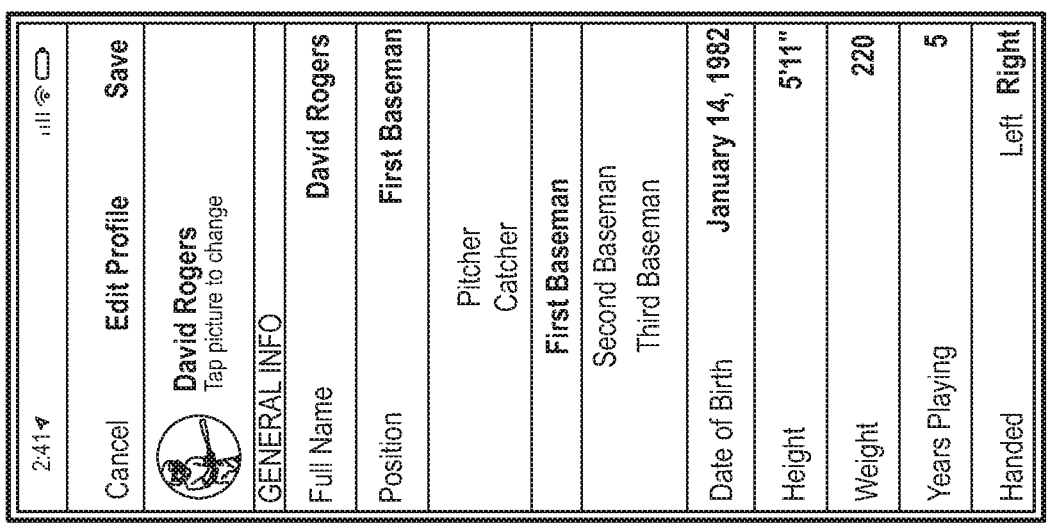
Figure 6G:
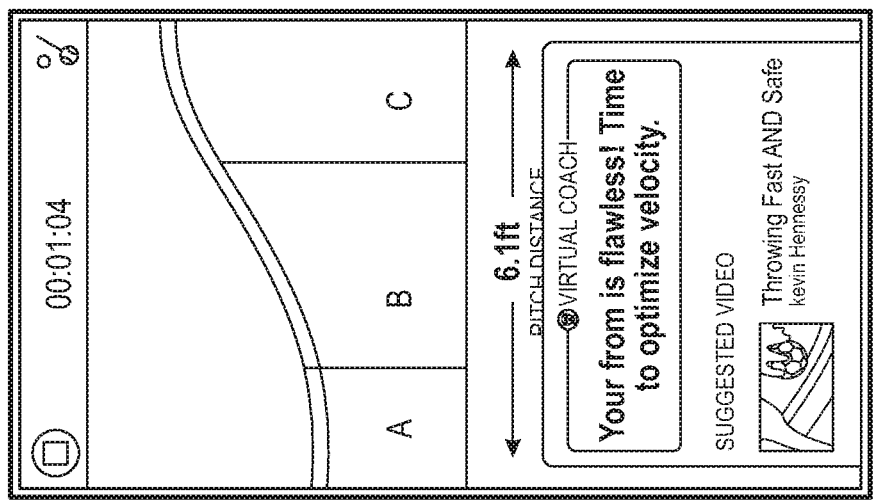
Figure 6F:
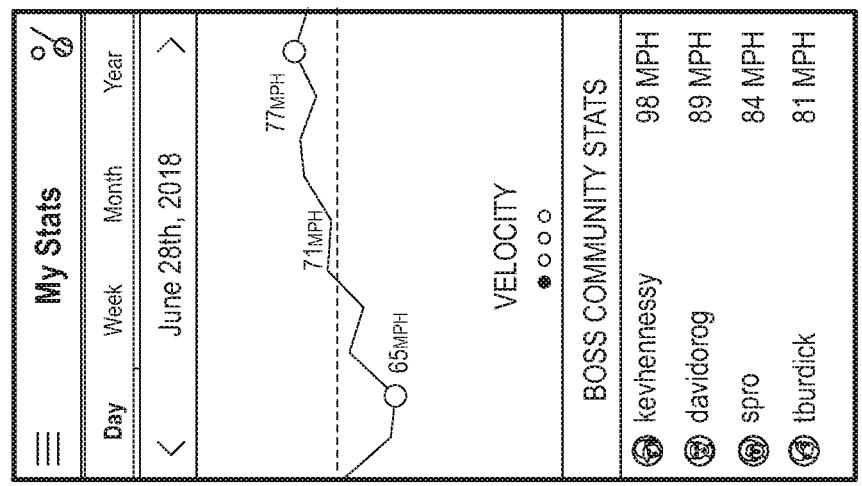
Figure 6E:
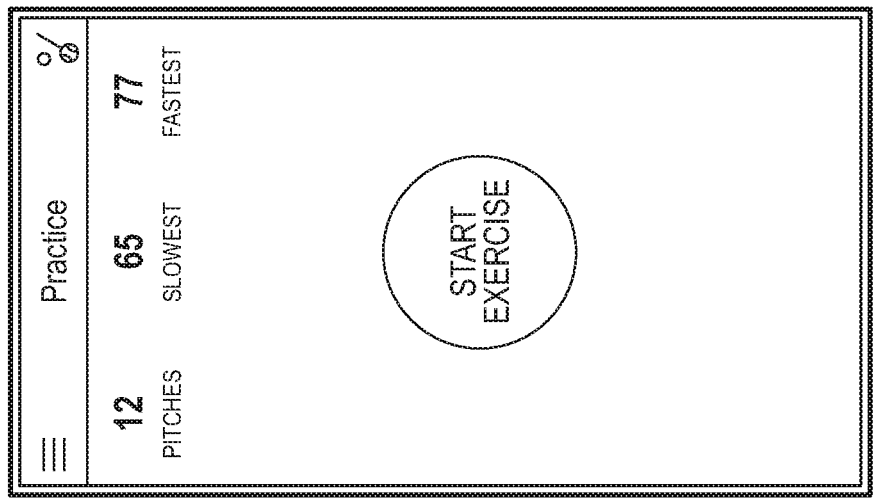
Figure 6J:
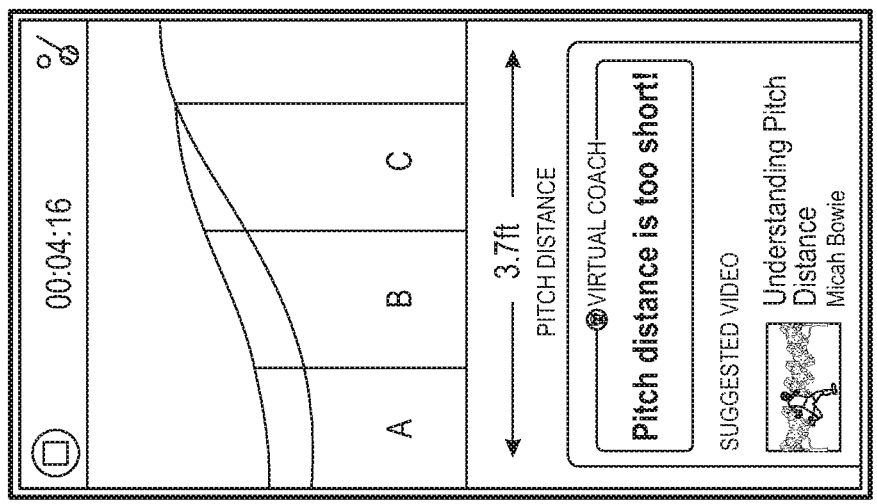
Figure 6I:
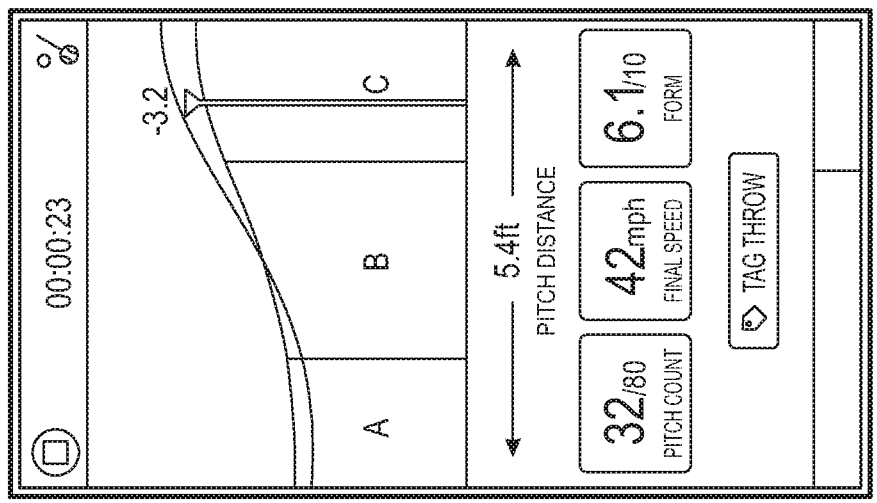
Figure 6H:
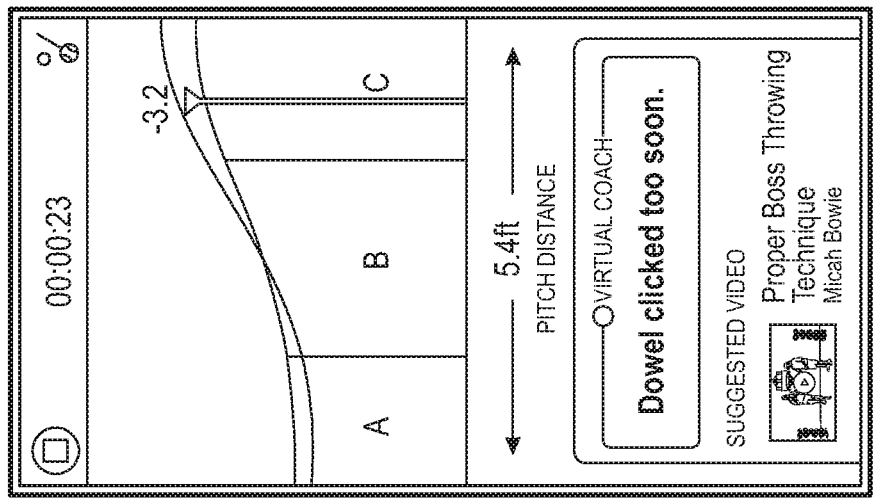
Figure 6M:
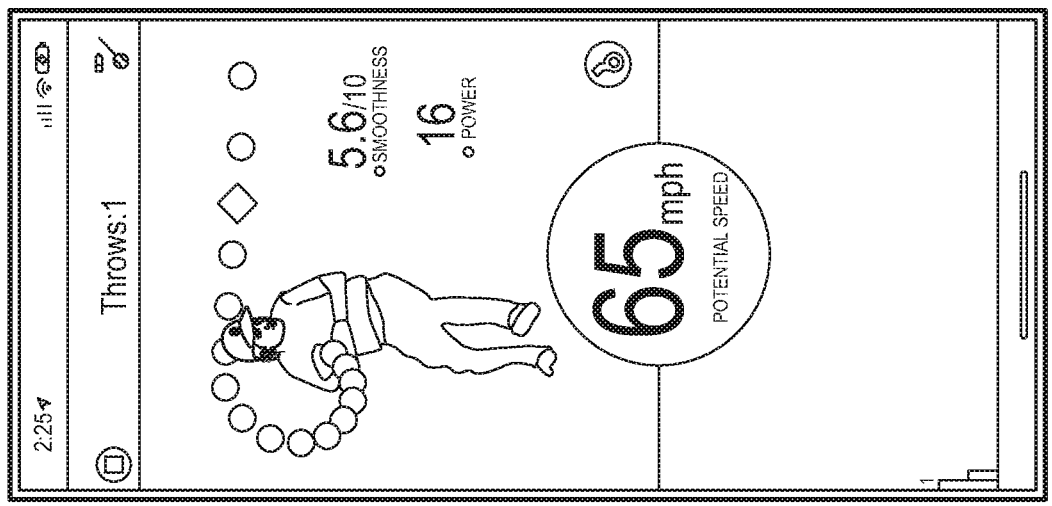
Figure 6L:
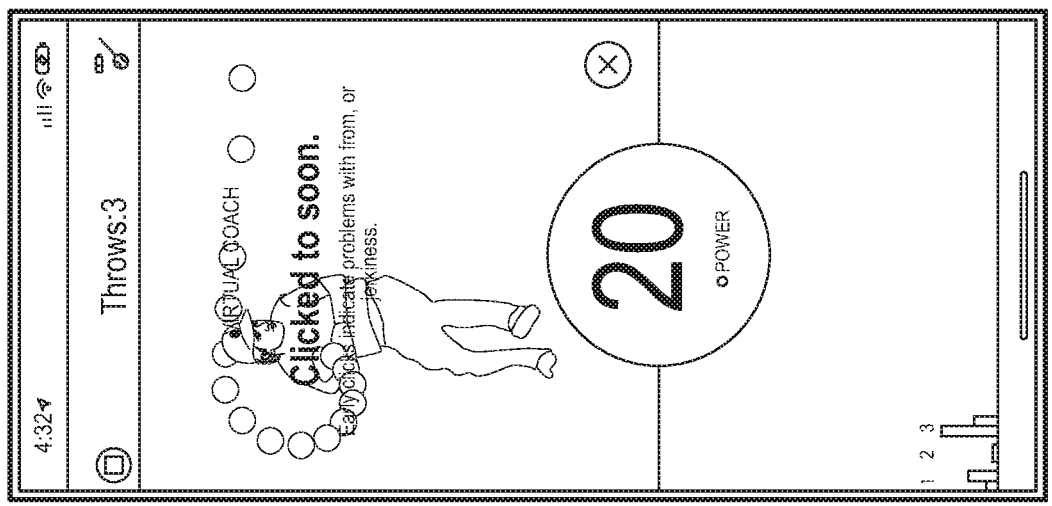
Figure 6K:
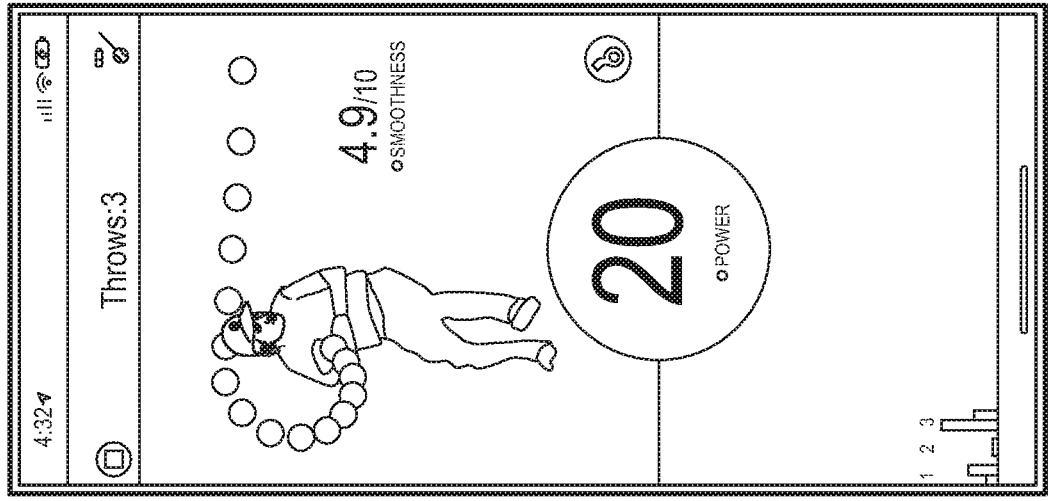
Figure 6P:
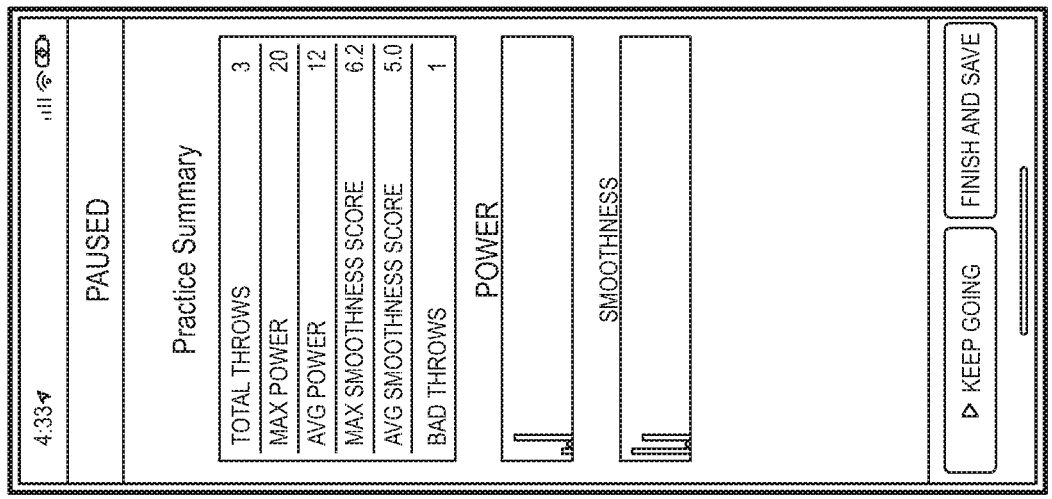
Figure 6O:
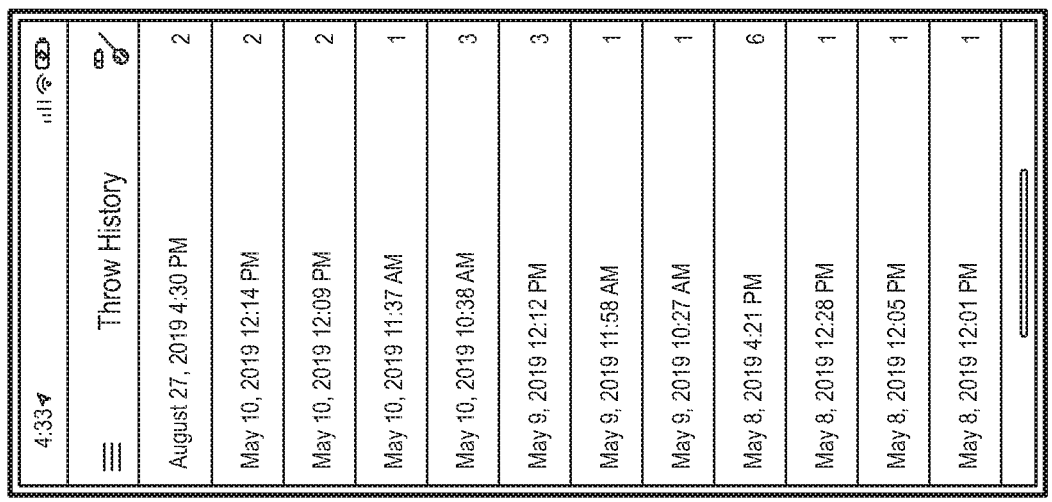
Figure 6N:
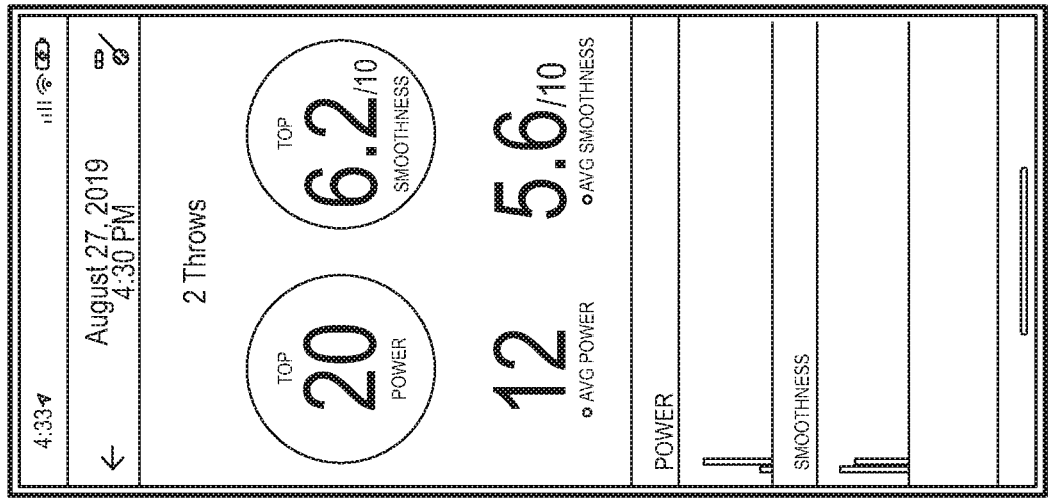
Figure 6Q:
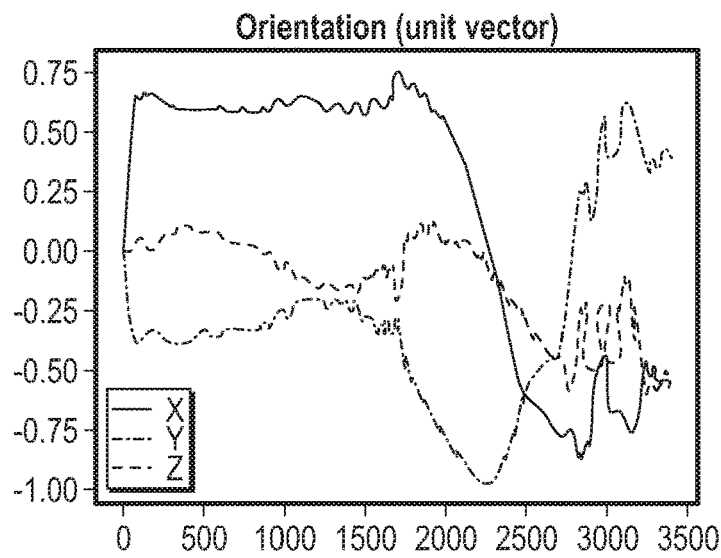
Figure 6Q:
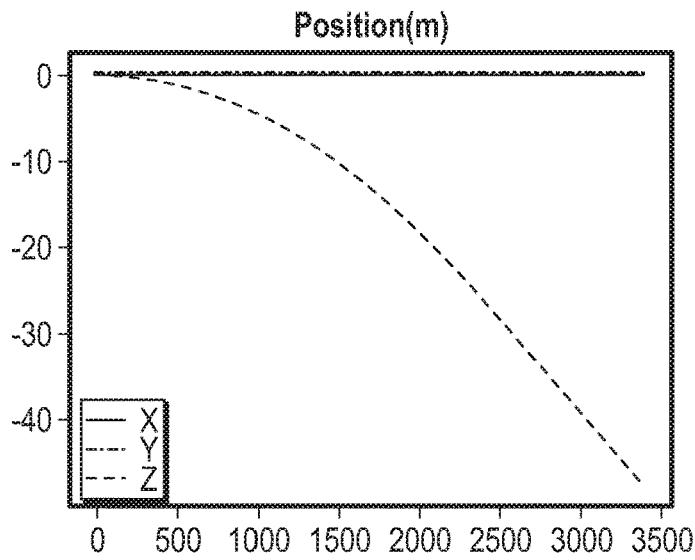
Figure 6Q:
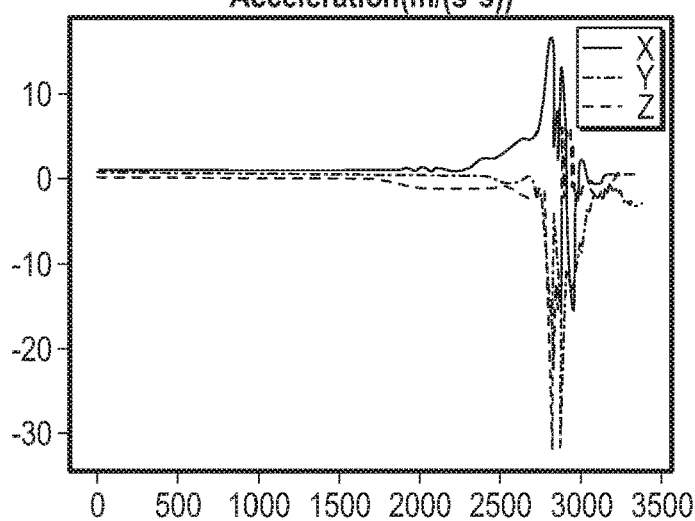
Figure 6Q:
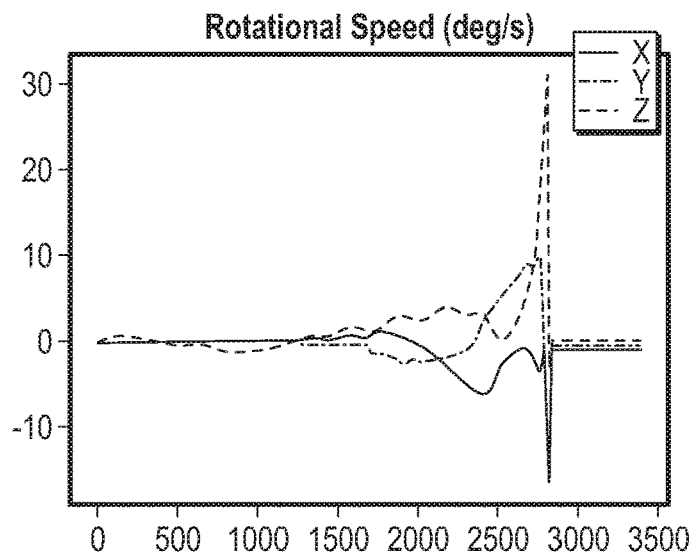
Figure 6Q:
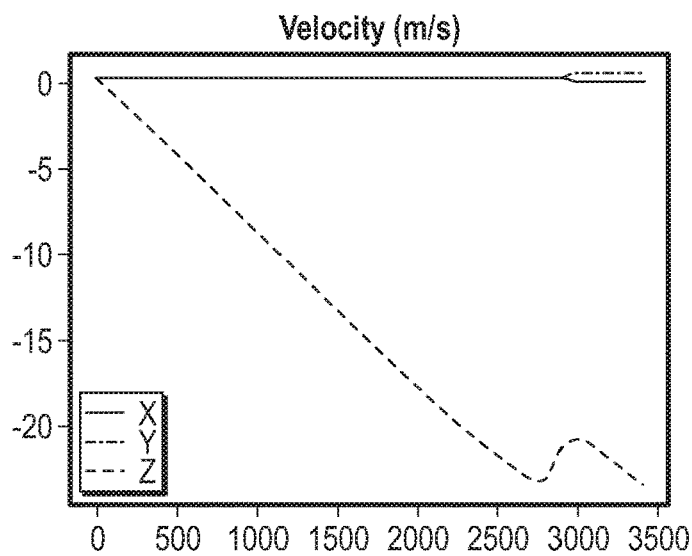
Figure 6Q:
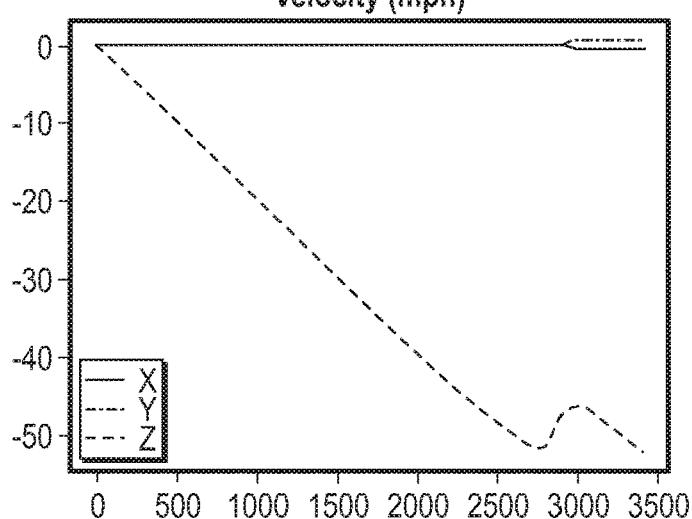

Example embodiments of the graphical user interface are shown in FIGS. 6A-6Q. FIGS. 6A-6B represent a login and sign up interface configured for a user to create a unique account configured to store data for the particular user, and log into their account as well to access stored data and begin new exercises. FIG. 6C of the GUI 500 shows a representation of a user profile. After the user enters in identifying data including but not limited to height, weight, and age.

FIG. 6D shows how the user may access training and exercise videos that may improve the athlete's strength and throwing motion. FIGS. 6E-6Q of the GUI 500 show graphical representations of the user interface for initiating a new exercise session, viewing collected statistical data overtime, and viewing instant data collected during the current exercise or throwing session.

Those of ordinary skill in the art will understand and appreciate the aforementioned description of the invention has been made with reference to certain exemplary embodiments of the invention, which describe a sports throwing motion training device and method of use. Those of skill in the art will understand that obvious variations in construction, material, dimensions or properties may be made without departing from the scope of the invention which is intended to be limited only by the claims appended hereto

The invention claimed is:

1. A throwing motion training device comprising:
a ball-shaped housing having a tubular member extending normal from the ball-shaped housing, wherein the tubular member comprises a proximal end extending from the ball-shaped housing and a closed distal end;
a motion device disposed within the tubular member configured to freely traverse the tubular member between the proximal end and the closed distal end of the tubular member;
a sensor hub disposed within a cavity of the ball-shaped housing;
the sensor hub having a plurality of sensors, a power source, power management circuitry, memory, a processor, a means for external communication and data transfer and a sensor hub operating system; and
the sensor hub operating system configured to collect motion data from the plurality of sensors and process the motion data with the processor, store the motion data on the memory or transfer the motion data through the means for external communication.

2. The throwing motion training device of claim 1 wherein the plurality of sensors comprises at least one of an accelerometer, an inertial measurement unit sensor, a gyroscope, and a magnetometer.

3. The throwing motion training device of claim 2 wherein the plurality of sensors comprises at least three accelerometers.

4. The throwing motion training device of claim 2 wherein the motion device comprises a magnetic dowel and the tubular member further comprises a proximal magnet coupled to the proximal end of the tubular member or ball-shaped housing, the proximal magnet configured to retain the magnetic dowel at the proximal end of the tubular member until separated by a force created by a throwing motion.

5. The throwing motion training device of claim 4 wherein the plurality of sensors comprises a magnetometer configured to detect when the magnetic dowel is forced away from the proximal magnet or configured to determine a global magnetic field orientation.

6. The throwing motion training device of claim 2 wherein the plurality of sensors further comprises at least one pressure sensor or touch sensor coupled to the ball-shaped housing configured to detect a hand position and grip strength and record the hand position and grip strength as motion data.

7. The throwing motion training device of claim 2 wherein the sensor hub operating system operates the plurality of sensors, power management circuitry, memory, processor, and means for external communication and data transfer according to the following software modules:
a sleeping state module configured to turn off the means for external communication, run the processor at a reduced clock rate, and place the plurality of sensors in a low power, less sensitive mode until activation through a wake gesture;

a listening state module activated through the wake gesture configured to power on the means for external communication and connect to an external computing device, further wherein the sensor hub returns to the sleeping state module if the external computing device is not present, or enters a collecting state module if the external computing device is present;

the collecting state module configured to turn the processor back to a normal clock rate and the plurality of sensors into full power data collection mode and collect throw motion data upon detection of a throw motion;

a post throw collecting module configured to isolate and extract relevant throw motion data from a data collection ring buffer that corresponds to the throw motion, further the post throw collecting module is configured to determine when a throw occurred based on a change of throw motion data collected pre and post throw; and pending transfer and transferring state modules configured to transfer the isolated throw motion data through the means of external communication to the external computing device for analysis.

8. The throwing motion training device of claim 2 wherein the throwing motion training device further comprises an external computing device comprising a display, a means for external communication with the throwing motion training device and data analysis software having a graphical user interface wherein the external computing device is configured to receive the motion data, process the motion data, and organize and display the motion data through the graphical user interface.

9. The throwing motion training device of claim 8 wherein the external computing device comprises a mobile phone, a computer, cloud server, gaming console, or a tablet computing device.

10. The throwing motion training device of claim 8 wherein the motion device traverses the tubular member from the proximal end to the closed distal end upon application of a throwing motion and impacts the closed distal end causing a vibration spike or auditory alert detected by the sensor hub;

further wherein the sensor hub operating system records and timestamps the vibration spike or auditory alert as a wrist snap data point into the memory of the sensor hub and transfers the wrist snap data point through the means of external communication to the external computing device to be analyzed by the data analysis software; and wherein the data analysis software compares the wrist snap data point to a pre-populated wrist snap data point, further wherein the data analysis software provides an alert through the graphical user interface displaying whether the wrist snap data point was too early or too late to be a proper throw compared to the pre-populated wrist snap data point.

11. The throwing motion training device of claim 10 wherein the motion device comprises a magnetic dowel and the tubular member further comprises a proximal magnet coupled to the proximal end of the tubular member or ball-shaped housing, the proximal magnet configured to retain the magnetic dowel at the proximal end of the tubular member until separated by a force created by a throwing motion.

12. The throwing motion training device of claim 11 wherein the plurality of sensors comprises a magnetometer configured to detect when the magnetic dowel is forced away from the proximal magnet or configured to determine a global magnetic field orientation.

13. The throwing motion training device of claim 8 wherein the data analysis software interpolates the motion data to calculate a set of throwing data comprising at least one of predicted throwing velocity, arm angle and position, arm motion, or predicted release point and display the set of throwing data through the graphical user interface.

14. The throwing motion training device of claim 13 wherein the data analysis software is configured to store multiple throwing data entries each having a unique time stamp; and further wherein the data analysis software is configured to compare the stored set of throwing data with previously recorded throwing data or previously populated model throwing data and display a comparison of data through the graphical user interface.

15. A method of using a throwing motion training device system comprising the steps of:

selecting a throwing motion training device comprising a ball-shaped housing having a tubular member extending normal from the ball-shaped housing, wherein the tubular member comprises a proximal end extending normal from the ball-shaped housing and a closed distal end, a motion device disposed within the tubular member configured to freely traverse the tubular member between the closed distal end and proximal end of the tubular member, a sensor hub disposed within a cavity of the ball-shaped housing, the sensor hub having a plurality of sensors, a power source, power management circuitry, memory, a processor, a means for external communication and data transfer and a sensor hub operating system;

aligning the motion device with the proximal end of the tubular member;

activating the throwing motion training device such that the sensor hub a enters active data collecting state through a preconfigured starting event;

beginning a throwing motion wherein the motion device is configured to travel longitudinally through the tubular member and impact the closed distal end of the tubular member upon a proper snapping wrist motion; and collecting motion data from the plurality of sensors through the sensor hub operating system and storing the motion data on the memory or transfer the motion data through the means for external communication during the throwing motion and configured to stop collecting data upon detection of a stop or change in predicted movement emulating a throw.

16. The method of claim 15 further comprising the step of pairing the throwing motion training device with an external computing device through the means for external communication; and the external computing device comprising a display, a means for throwing motion training device communication and data analysis software having a graphical user interface.

17. The method of claim 16 further comprising the step of transferring the collected motion data from the sensor hub through the means of external communication to the external computing device and additionally comprising the step of analyzing the motion data on the external computing device data analysis software and organizing and displaying the motion data through the graphical user interface.

18. The method of claim 17 wherein travel of the motion device from the proximal end to the closed distal end upon application of a throwing motion and impacts the closed distal end causing a vibration spike or auditory alert detected by the sensor hub;

the step of collecting motion data further comprises the sensor hub recording and timestamping the vibration spike or auditory alert as a wrist snap data point into the memory of the sensor hub;

the step of transferring the collected motion data further comprises transferring the wrist snap data point through the means of external communication to the external computing device to be analyzed by the data analysis software; and wherein the step of analyzing the motion data further comprises comparing the wrist snap data point to a pre-populated wrist snap data point providing an alert through the graphical user interface displaying whether the wrist snap data point was too early or too late to be a proper throw compared to the pre-populated wrist snap data point.

19. The method of claim 18 wherein the motion device comprises a magnetic dowel and the tubular member further comprises a proximal magnet coupled to the proximal end of the tubular member or ball-shaped housing, the proximal magnet configured to retain the magnetic dowel at the proximal end of the tubular member and further wherein the step of beginning a throwing motion further comprises the step of generating a force strong enough to separate the magnetic dowel from the proximal magnet and the step of collecting data further comprises separation force data as a part of the motion data through a magnetometer coupled to the sensor hub.

20. The method of claim 17 wherein the step of analyzing the data includes the data analysis software interpolating the motion data and calculating a set of throwing data comprising at least one of predicted throwing velocity, arm angle and position, arm motion, or predicted release point and displaying the set of throwing data through the graphical user interface or store multiple sets of throwing data entries each having a unique time stamp, comparing the stored throwing data entries with previously recorded throwing data entries or previously populated model throwing data and displaying a comparison of data through the graphical user interface.

* * * * *